United States Patent [19]
Beeteson et al.

[11] 4,410,840
[45] Oct. 18, 1983

[54] COLOR CATHODE RAY TUBE DISPLAY APPARATUS WITH COMPENSATION FOR ERRORS DUE TO INTERFERING MAGNETIC FIELDS

[75] Inventors: John S. Beeteson; Brian L. Holloway; Krzystof T. Jarzebowski, all of Winchester, England

[73] Assignee: International Business Machines Corporation, Armonk, N.Y.

[21] Appl. No.: 281,810

[22] Filed: Jul. 9, 1981

[30] Foreign Application Priority Data

Oct. 24, 1980 [EP] European Pat. Off. ........ 80303789.4

[51] Int. Cl.$^3$ ........................ H01J 29/70; H01J 29/76
[52] U.S. Cl. .................................. 315/368; 315/13 C
[58] Field of Search ........................... 315/368, 13 C

[56] References Cited

U.S. PATENT DOCUMENTS

| | | | |
|---|---|---|---|
| 3,743,882 | 7/1973 | Kroner et al. | 315/13 C |
| 3,821,591 | 6/1974 | Lister | 315/13 C |
| 4,095,137 | 6/1978 | Oswald | 315/13 C |
| 4,097,784 | 6/1978 | Fischman et al. | 315/368 |

Primary Examiner—Theodore M. Blum
Attorney, Agent, or Firm—Joseph J. Connerton

[57] ABSTRACT

A color cathode ray tube display apparatus is provided with compensation for errors due to interfering magnetic fields in which a deflection yoke causes the electron beams to raster scan across the tube, a convergence assembly on the neck of the cathode ray tube adjusting the beam convergence. Errors in the waveforms suppied to the radial convergence assembly are caused by high frequency magnetic field coupling between the yoke and the convergence assembly via the internal magnetic structure 7 of the cathode ray tube. A compensating coil 11, placed adjacent the convergence coil unit 12, 16 supplies compensating current through resistor 20 to the amplifier 15 driving the convergence coil unit, thus avoiding a fringe on the left-hand side of the screen. Alternatively, compensating current can be derived from the line flyback pulse or the logic signal initiating line flyback.

6 Claims, 5 Drawing Figures

COLOR CATHODE RAY TUBE DISPLAY APPARATUS WITH COMPENSATION FOR ERRORS DUE TO INTERFERING MAGNETIC FIELDS

BACKGROUND OF THE INVENTION

This invention relates to a color cathode ray tube apparatus in which a deflection yoke is used to cause the electron beams to raster scan across the screen and in which a convergence assembly on the neck of the tube adjusts the convergence of the beams.

With a delta-gun CRT color display, a large green fringe can become apparent on vertical lines on the extreme left-hand edge of the screen when displaying data. This problem is apparently due to magnetic pickup from the deflection yoke.

During line flyback of the raster scan, high frequency magnetic fields from the deflection yoke interact with the coils of the convergence assembly on the neck of the tube. The magnetic fields feed through the internal convergence structure in the tube and through the ferrite/coil structure of the convergence assembly.

The pulse induced in the assembly is spread because of the frequency response characteristics of the tube and convergence assembly structure, and is of a polarity to oppose the waveform being generated to achieve convergence of the beams. The spreading of the pulse causes the convergence waveform to be in error over the first few microseconds of the video signal. Although the error is small, it can be significant in high-precision color displays.

SUMMARY OF THE INVENTION

An object of the present invention is to provide an improved color CRT display apparatus in which the aforementioned problem is mitigated.

According to the invention, a color cathode ray tube display apparatus comprises a color cathode ray tube, a deflection yoke for causing the electron beams of the cathode ray tube to scan the screen thereof, and a convergence assembly on the neck of the tube to which waveforms can be supplied for adjusting the convergence of the beams, and is characterized in that compensation means are provided for compensating for errors in the convergence assembly waveforms due to an induced current pulse caused by interaction of the magnetic field from the deflection yoke with the convergence assembly.

In a preferred embodiment of the invention, compensation is obtained by employing a compensation coil located adjacent the convergence assembly to pick up the same interfering magnetic field as the convergence assembly itself. The current incuded in this coil is fed back to the appropriate convergence coil driving amplifier in a direction to cancel the pulse induced in the convergence assembly. Alternatively, a compensating signal can be derived from either the line flyback pulse or from a logic signal initiating line flyback and fed into the convergence coil driving amplifier in such a direction as to oppose the induced pulse. To allow variations from tube to tube, potentiometer control of the compensating pulse may be provided.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
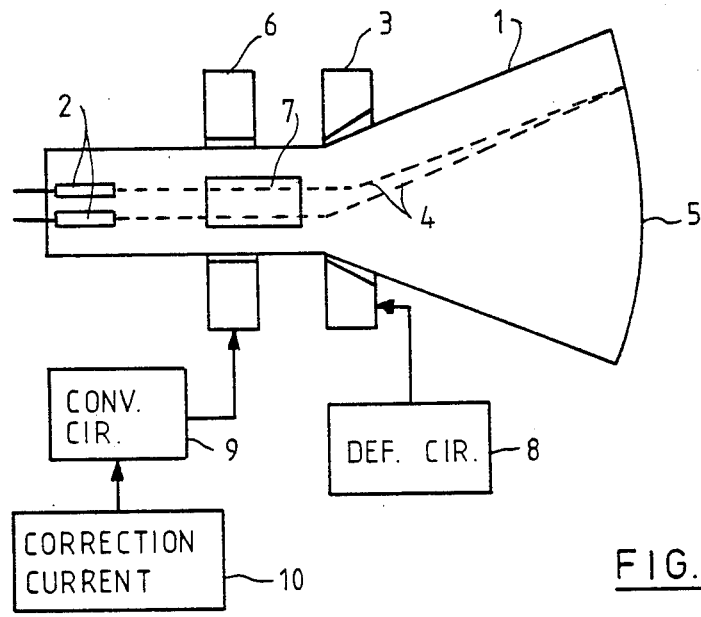
FIG. 1 illustrates a color cathode ray tube with some of its associated components.

Referring now to FIG. 1, a color cathode ray tube 1 has three electron guns 2 (only two being shown). Magnetic yoke 3 around the neck of the CRT 1 causes the electron beams 4 from the electron guns 2 to raster scan across the screen 5. A convergence coil assembly 6 is mounted on the neck of the CRT 1, and in conjunction with internal magnetic structure 7, provides convergence of the three beams during the raster scan. X and Y deflection currents are supplied to the yoke 3 from deflection circuits 8, while convergence correction waveforms provided by correction current block 10 are supplied to the convergence assembly 6 by convergence circuits 9.

As described so far, the apparatus is conventional. We have found that where the CRT 1 is a high precision, delta-gun, color CRT used to display data, such as is used in the IBM 3279 color display station, a vertically extending green fringe will sometimes be displayed on the left-hand side of the screen. On some displays, this vertical fringe extends further towards the center of the screen.

The cause of this problem is magnetic pick-up from the deflection yoke 3. The magnetic field of the high frequency horizontal retrace couples into the red and green radial convergence assemblies 6 via the internal magnetic structure 7, inducing a current in the convergence coils 6 in a direction as to aid the red channel but to oppose the green channel. As a result, the leading edge of the green parabola (the correction waveform for the green convergence coil) bends in the opposite direction to that required, thereby inducing a convergence error. This shows up as an underconverged area of green on the extreme left of the screen. It is possible, during convergence, to correct the green fringe on the extreme left, but this only moves the convergence error towards the center of the screen.

The blue channel has no induced pulse because the alignment of the blue convergence structure is such that the magnetic lines of force do not cause current induction. Magnetic shielding cannot be used because magnetic coupling is required between the internal tube structure 7 and the convergence coil assembly 6.

In accordance with the invention, the problem is mitigated by providing compensation current to the convergence assembly by means of a compensation current means represented diagrammatically by 10 in FIG. 1.

Figure 2:
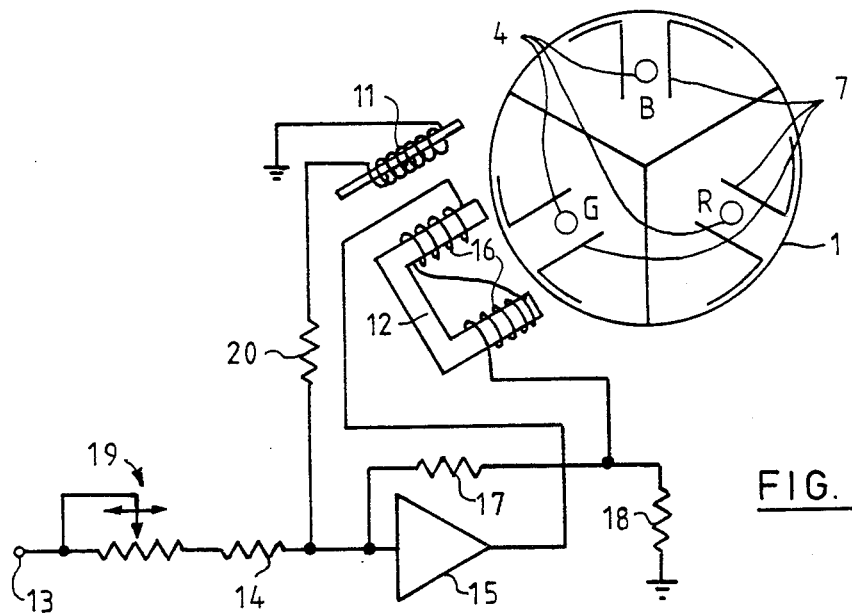
FIG. 2 illustrates a preferred embodiment of the invention in which a compensating coil is used to compensate for the effect of magnetic field interference.

FIG. 2 illustrates a preferred embodiment of the invention in which a secondary coil 11 is located adjacent the green radial convergence coil unit 12. In FIG. 2, red, blue and green electron beams 4 are radially converged using the convergence assembly 6 and the internal magnetic structure 7 (FIG. 1). Only the green convergence coil unit 12 is shown in FIG. 2 since, as explained above, only the green channel has a problem with magnetic field interference from the yoke 3 of FIG. 1.

The convergence waveform for the green channel is supplied from terminal 13 through resistor 14 to the coil driving amplifier 15 whose output is connected to the windings 16 of the green convergence unit 12. Resistors 17 and 18 provide feedback between the output and input of the amplifier 15. Potentiometer 19 allows the gain of the circuit to be adjusted. Each of the blue and red radial convergence units (not shown) will have a similar arrangement.

To prevent the aforementioned green fringe, current induced in the secondary coil 11 is applied through the resistor 20 to the input of the coil driving amplifier 15 in such a manner as to cancel the effect of the induced pulse in convergence unit 12. Because the secondary coil 11 responds to the same interfering magnetic field as the convergence assembly, correction is exact and automatically compensates for any variations from tube to tube.

Figure 3:
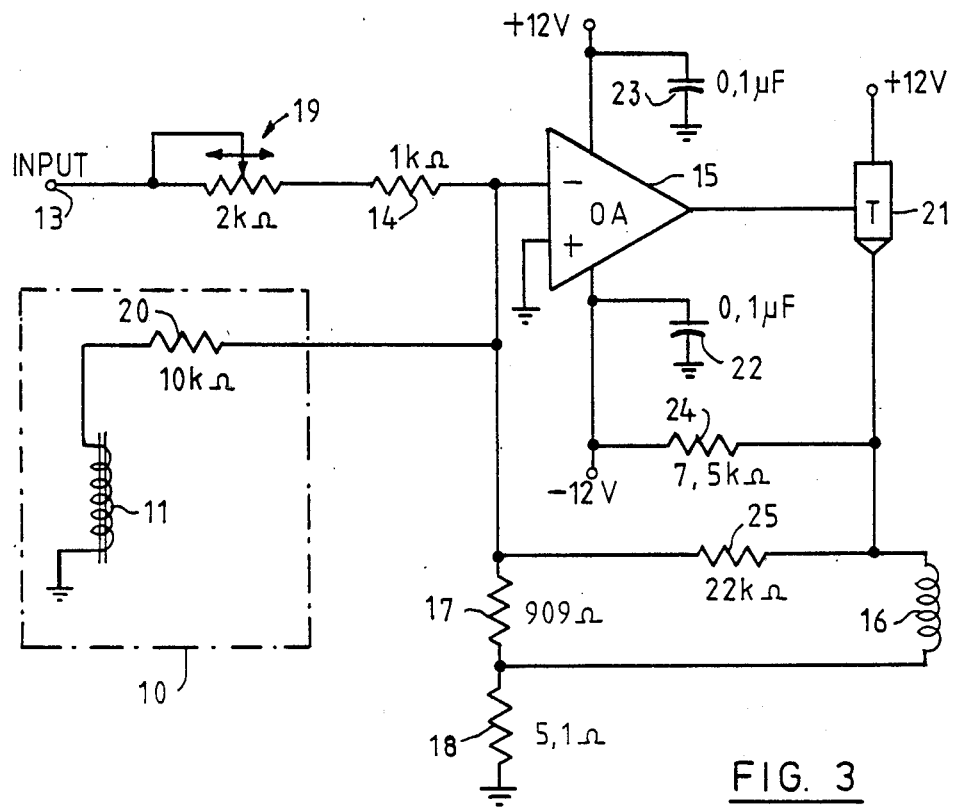
FIG. 3 illustrates a circuit diagram of the preferred embodiment of FIG. 2.

FIG. 3 is a schematic diagram of a convergence amplifier having component values indicated thereon which can be used with the IBM 3279 color display station and provided with current compensation means 10. Typically the secondary coil 11 can be constituted by 63 turns on a mu-metal or ferrite core. The convergence amplifier is a conventional coil driver, with operational amplifier 15 providing controlled gain, and transistor 21 giving added current drive capability. Capacitors 22 and 23 are placed physically close to the power inputs of amplifier 15 to prevent high frequency instability. Resistor 24 provides some current through the transistor 21 at zero output, while resistor 25 prevents amplifier 15 being operated open loop when fast rising inputs are applied at 13 to maintain stability. Resistors 14, 17 and 18 and potentiometer 19 define the current gain of the whole amplifier.

Coil current = Input voltage × $R17/R18(R14+R19)$

The amplifier 15 can comprise a National Semiconductor operational amplifier Type No. LM318, while transistor 21 can comprise a Texas Instrument transistor, Type No. TIP41.

Figure 4:
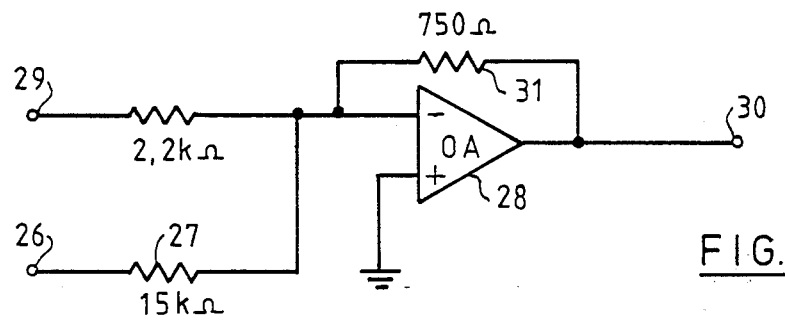
FIG. 4 illustrates a circuit diagram showing an alternative embodiment of the invention.

FIG. 4 illustrates an alternative embodiment of the invention in which a compensating signal is derived from the logic pulse which initiates line flyback supplied to terminal 26. A 15 K ohm resistor 27 supplies current to the input of an operational amplifier 28 in such a direction as to oppose the magnetically induced pulse. Input terminal 29 receives the output of the conventional digital to analog converter used in the green convergence channel. The output terminal 30 of the circuit is connected to the radial-convergence-coil driver (input 13, FIGS. 2 and 3). In this embodiment, of course, the secondary coil 11 of FIGS. 2 and 3 would not be used. 750 ohm resistor 31 performs the conventional feedback function for the operational amplifier 28. The value of resistor 27 is chosen experimentally to give the best compromise on the best and worse displays. However, exact compensation can be obtained by replacing the fixed resistor 27 with a potentiometer 32, as shown in FIG. 5.

Figure 5:
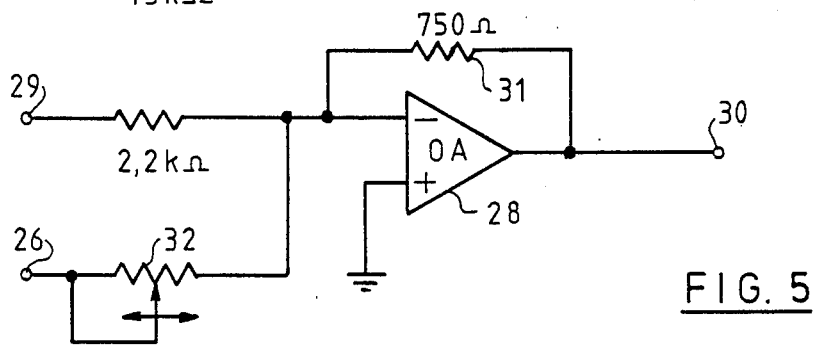
FIG. 5 illustrates a modification of the embodiment of FIG. 4.

In FIGS. 4 and 5, the compensating current has been derived from the horizontal synchronization pulse. Those skilled in the art will appreciate that the compensation current can also be derived from the line flyback or retrace pulse.

The invention has been described with reference to the correction of a green fringe in a delta-gun color CRT. Those skilled in the art will appreciate that the principles of the invention can also be applied to the correction of field induced defects in any type of multigun color CRT, such as in-line CRT's, particularly where these have internal magnetic structures which prevent the use of screening. The invention can be used to mitigate color fringing problems in the red and blue channels should a particular CRT, yoke and convergence assembly combination give rise to problems in the red and blue channels rather than the green channel as described above.

While the invention has been particularly shown and described with reference to preferred embodiments thereof, it will be understood by those skilled in the art that various changes in form and detail may be made therein without departing from the spirit and scope of the invention.

We claim:

1. A color cathode ray tube display apparatus comprising in combination a color cathode ray tube,
    a deflection yoke for causing the electron beams of the cathode ray tube to scan the screen thereof, and
    a convergence assembly on the neck of the tube to which waveforms can be supplied for adjusting the convergence of the beams, characterized in that compensation means are provided for compensating for errors in the convergence assembly waveforms due to an induced current signal caused by interaction of the magnetic field from said deflection yoke with said convergence assembly.

2. Apparatus as claimed in claim 1 characterized in that said compensation means includes means for providing a compensating current signal to said convergence assembly in a direction to oppose said induced current signal.

3. Apparatus as claimed in claim 2 characterized in that said compensating current signal is derived from a pulse induced in a coil positioned adjacent said convergence assembly to receive said interacting magnetic field.

4. Apparatus as claimed in claim 2 characterized in that said compensating current signal is derived from each line flyback pulse.

5. Apparatus as claimed in claim 4 characterized in that said compensating current signal is derived from a logic signal initiating line flyback.

6. Apparatus as claimed in claim 4 characterized in that said compensating current signal is applied through a potentiometer to provide exact compensation of the error due to said induced pulse.

* * * * *